United States Patent
Yamazaki

(10) Patent No.: US 11,973,396 B2
(45) Date of Patent: Apr. 30, 2024

(54) ELECTRIC TRANSMISSION FOR AN ELECTRIC LAWNMOWER

(71) Applicant: Honda Motor Co., Ltd., Tokyo (JP)

(72) Inventor: Tatsuya Yamazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 512 days.

(21) Appl. No.: 17/218,805

(22) Filed: Mar. 31, 2021

(65) Prior Publication Data

US 2022/0320943 A1   Oct. 6, 2022

(51) Int. Cl.
| | |
|---|---|
| *H02K 5/10* | (2006.01) |
| *A01D 34/69* | (2006.01) |
| *A01D 101/00* | (2006.01) |
| *B60L 50/00* | (2019.01) |
| *H02K 5/20* | (2006.01) |

(52) U.S. Cl.
CPC ............... *H02K 5/10* (2013.01); *A01D 34/69* (2013.01); *B60L 50/00* (2019.02); *H02K 5/207* (2021.01); *A01D 2101/00* (2013.01)

(58) Field of Classification Search
CPC .......... H02K 5/10; H02K 5/207; H02K 7/006; H02K 9/06; H02K 9/04; A01D 34/69; A01D 2101/00; A01D 34/81; A01D 34/828; B60L 50/00; B60L 2200/40; B60K 17/12; B60K 1/00
See application file for complete search history.

(56) References Cited

U.S. PATENT DOCUMENTS

| | | | |
|---|---|---|---|
| 7,690,176 B2 | 4/2010 | Shinn | |
| 10,141,798 B2* | 11/2018 | Rogginger | H02K 1/20 |
| 10,188,032 B2* | 1/2019 | Ito | A01D 34/81 |
| 11,140,821 B2* | 10/2021 | Hasegawa | A01D 34/78 |
| 11,399,459 B2* | 8/2022 | Nishimura | H02K 5/207 |
| 2011/0109176 A1* | 5/2011 | Yoshimura | H02K 9/227 310/64 |
| 2015/0000549 A1* | 1/2015 | Nagayama | H02K 9/06 310/59 |

(Continued)

FOREIGN PATENT DOCUMENTS

| | | |
|---|---|---|
| CN | 201260110 Y | 6/2009 |
| CN | 206423132 U | 8/2017 |

(Continued)

*Primary Examiner* — James A Shriver, II
*Assistant Examiner* — Ian Bryce Shelton
(74) *Attorney, Agent, or Firm* — Joshua Freier; American Honda Motor Co., Inc.

(57) ABSTRACT

An electric transmission for an electric lawnmower is disclosed. The electric transmission is adapted to operatively connect to a plurality of wheels for driving the electric lawnmower over a ground surface. The electric transmission includes an electric motor and a housing encasing the electric motor. The housing includes a cylindrical body defining a chamber for receiving the electric motor, an inlet conduit, and an outlet conduit. The inlet conduit is connected to the cylindrical body and extends outwardly from the cylindrical body to facilitate a flow of air inside the chamber. The outlet conduit is disposed spaced apart from the inlet conduit. Further, the outlet conduit is connected to the cylindrical body and extends outwardly from the cylindrical body to facilitate an exit of air from the chamber to an ambient.

9 Claims, 7 Drawing Sheets

(56) References Cited

U.S. PATENT DOCUMENTS

| 2015/0359170 | A1* | 12/2015 | Ito ......................... | A01D 34/78 |
| | | | | 56/16.9 |
| 2020/0263702 | A1* | 8/2020 | Martin, III .......... | F04D 29/5806 |
| 2020/0383267 | A1* | 12/2020 | Nishimura ............. | A01D 34/68 |

FOREIGN PATENT DOCUMENTS

| CN | 107251377 A | * | 10/2017 | ............ F16C 35/067 |
| CN | 107276292 A | * | 10/2017 | |
| CN | 108649733 A | * | 10/2018 | ............... H02K 5/10 |
| CN | 106687694 B | * | 12/2018 | ........... F04D 17/105 |
| DE | 3232895 C2 | | 2/1986 | |
| DE | 9211347 U1 | | 12/1992 | |
| GB | 2318967 A | * | 5/1998 | ........... A01D 34/695 |
| GB | 2318967 A | | 5/1998 | |
| JP | H06-62637 A | | 3/1994 | |
| JP | 2018088852 A | * | 6/2018 | ......... A01D 34/6806 |
| WO | WO-2019123659 A1 | * | 6/2019 | ............. A01D 34/68 |
| WO | WO-2020067707 A1 | * | 4/2020 | ............... F16H 3/44 |

* cited by examiner

ELECTRIC TRANSMISSION FOR AN ELECTRIC LAWNMOWER

BACKGROUND

The disclosed subject matter relates generally to a lawnmower. More particularly, the disclosed subject matter relates to an electric transmission for a lawnmower.

Lawnmowers are, generally, washed by water after being used and sometimes used when raining. Therefore, electric transmissions for lawnmowers need to be water-proof. Some lawnmowers have a completely closed type electric transmissions, which leads to overheat problem because of no air vent.

SUMMARY

In accordance with one embodiment of the present disclosure, an electric transmission for an electric lawnmower is disclosed. The electric transmission is adapted to operatively connect to a plurality of wheels for driving the electric lawnmower over a ground surface. The electric transmission includes an electric motor and a housing encasing the electric motor. The housing includes a cylindrical body defining a chamber for receiving the electric motor, an inlet conduit, and an outlet conduit. The inlet conduit is connected to the cylindrical body and extends outwardly from the cylindrical body to facilitate a flow of air inside the chamber. The outlet conduit is disposed spaced apart from the inlet conduit. Further, the outlet conduit is connected to the cylindrical body and extends outwardly from the cylindrical body to facilitate an exit of air from the chamber to an ambient.

In accordance with another embodiment of the present disclosure, an electric lawnmower is provided. The electric lawnmower includes a plurality of wheels for facilitating a travel of the electric lawnmower over a surface, and an electric transmission operatively connected to the plurality of wheels to drive the electric lawnmower over the surface. the electric transmission includes an electric motor and a housing encasing the electric motor. The housing has a cylindrical body defining a chamber for receiving the electric motor, an inlet conduit, and an outlet conduit. The inlet conduit is connected to the cylindrical body and extends outwardly from the cylindrical body to facilitate a flow of air inside the chamber. Further, the outlet conduit is disposed spaced apart from the inlet conduit. The outlet conduit is connected to the cylindrical body and extends outwardly from the cylindrical body to facilitate an exit of air from the chamber to an ambient.

In accordance with yet a further embodiment of the present disclosure, an electric transmission for an electric lawnmower is disclosed. The electric transmission is operatively connected to a plurality of wheels for driving the electric lawnmower over a ground surface. The electric transmission includes an electric motor, and a housing encasing the electric motor. The housing includes a cylindrical body defining a chamber for receiving the electric motor, an inlet conduit, and an outlet conduit. The inlet conduit extends outwardly to the cylindrical body to facilitate a flow of air inside the chamber. The inlet conduit includes a first inlet structure defining an inlet port of the inlet conduit and disposed tangentially to the cylindrical body. The inlet conduit also includes a second inlet structure defining an outlet port of the inlet conduit and extending radially outwardly from the cylindrical body to the first inlet structure. The second inlet structure is arranged substantially perpendicularly to the first inlet structure. Moreover, the outlet. The outlet conduit extends outwardly to the cylindrical body to facilitate an exit of air from the chamber to an ambient. Further, the outlet conduit includes a first outlet structure defining an outlet opening of the outlet conduit and disposed tangentially to the cylindrical body. The outlet conduit also includes a second outlet structure defining an inlet opening of the outlet conduit and extending radially outwardly from the cylindrical body to the first outlet structure. The second outlet structure is arranged substantially perpendicularly to the first outlet structure.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-7, wherein like numbers indicate the same or corresponding elements throughout the views.

Figure 1:
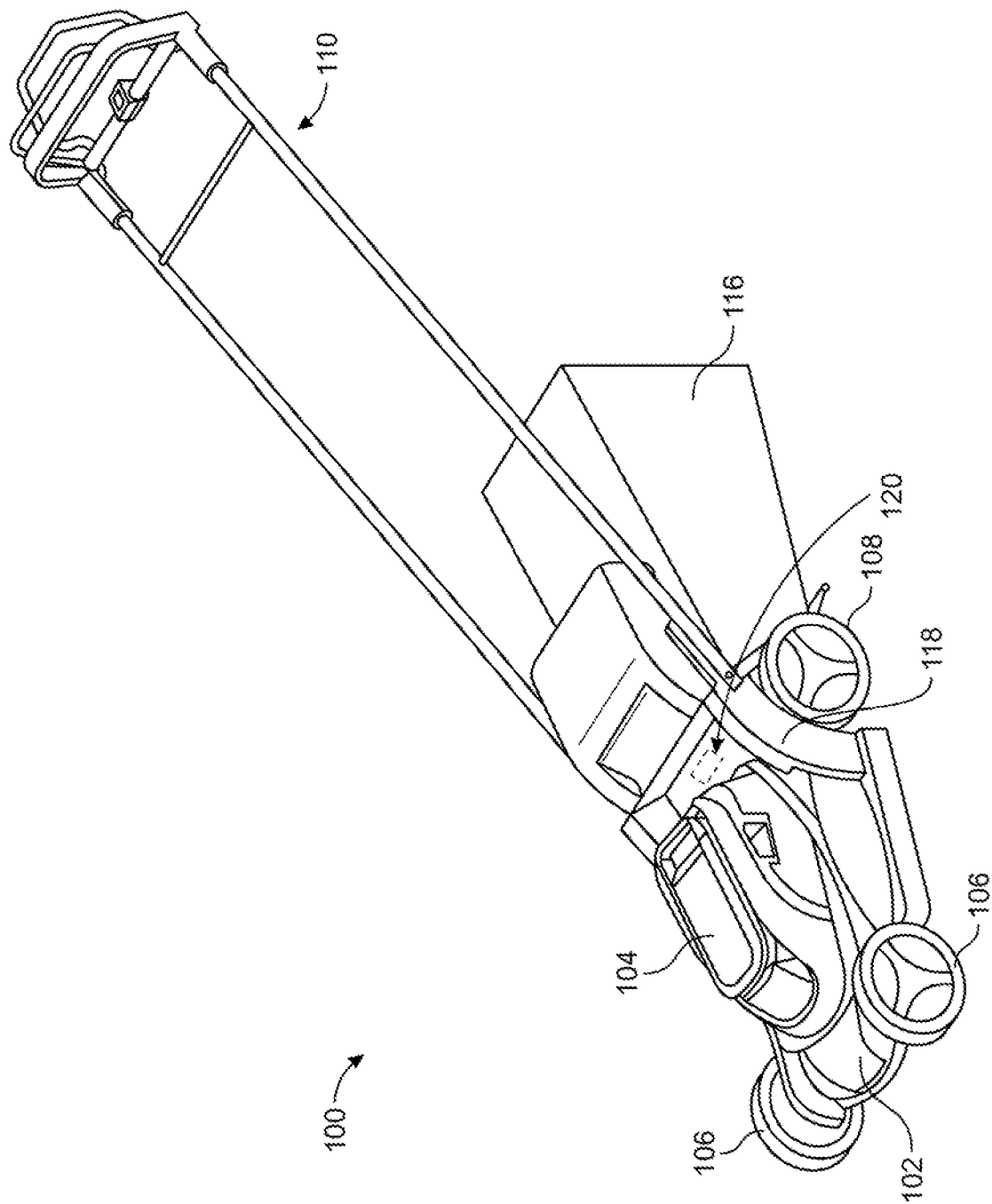
FIG. 1 is a perspective view depicting an electric lawnmower, in accordance with one embodiment of the present disclosure.

FIG. 1 illustrates a perspective view of an electric lawnmower, indicated generally as 100, in accordance with one embodiment of the present disclosure. The electric lawnmower 100 (hereinafter referred to as the lawnmower 100) is shown as a push type lawnmower. The lawnmower 100 includes a main body 102, a work unit 104 attached of the main body 102, a pair of front wheels 106, a pair of rear wheels 108, and a handle 110 extending rearward and upward from the main body 102. The work unit 104 is provided with a blade (not shown) and an electric motor (not shown) having an output shaft supporting the blade and adapted to rotate the blade for cutting the grass. Also, the lawnmower 100 includes a bag 116 removably mounted to the main body 102 and adapted to receive the grass when the work unit 104 is operated. The bag extends rearwardly from the main body 102. Further, the lawnmower 100 includes an electric transmission 120 that is operatively connected with the rear wheels 108 to rotate the rear wheels 108 and propels the lawnmower 100. The electric transmission 120 may disposed under a rear portion 118 of the main body 102 and may be disposed proximate to the rear wheels 108.

Figure 2:
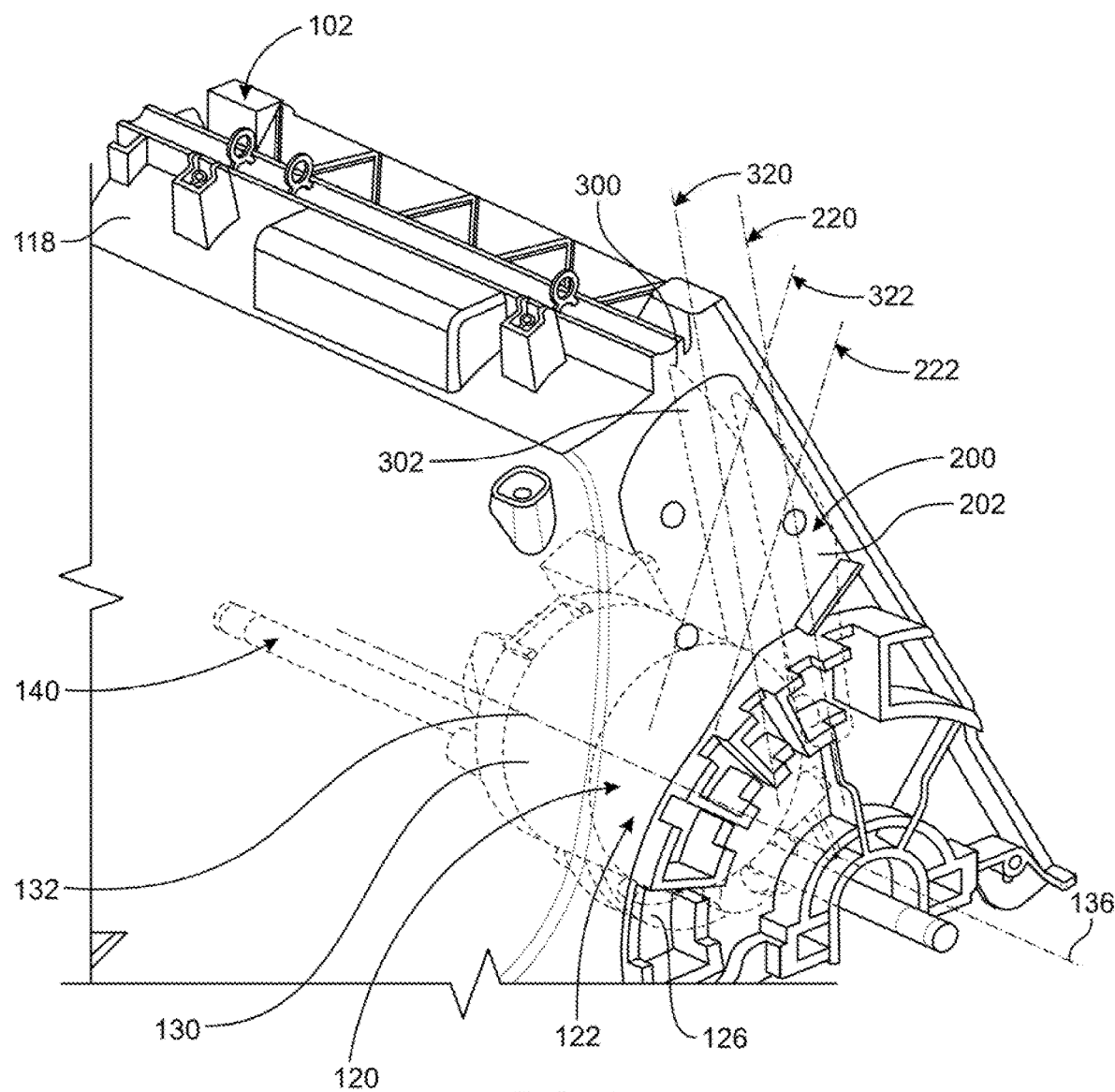
FIG. 2 is enlarged view of a rear portion of the electric lawnmower depicting a electric transmission disposed under a rear portion of a main body of the electric lawnmower, in accordance with one embodiment of the present disclosure.
Figure 3:
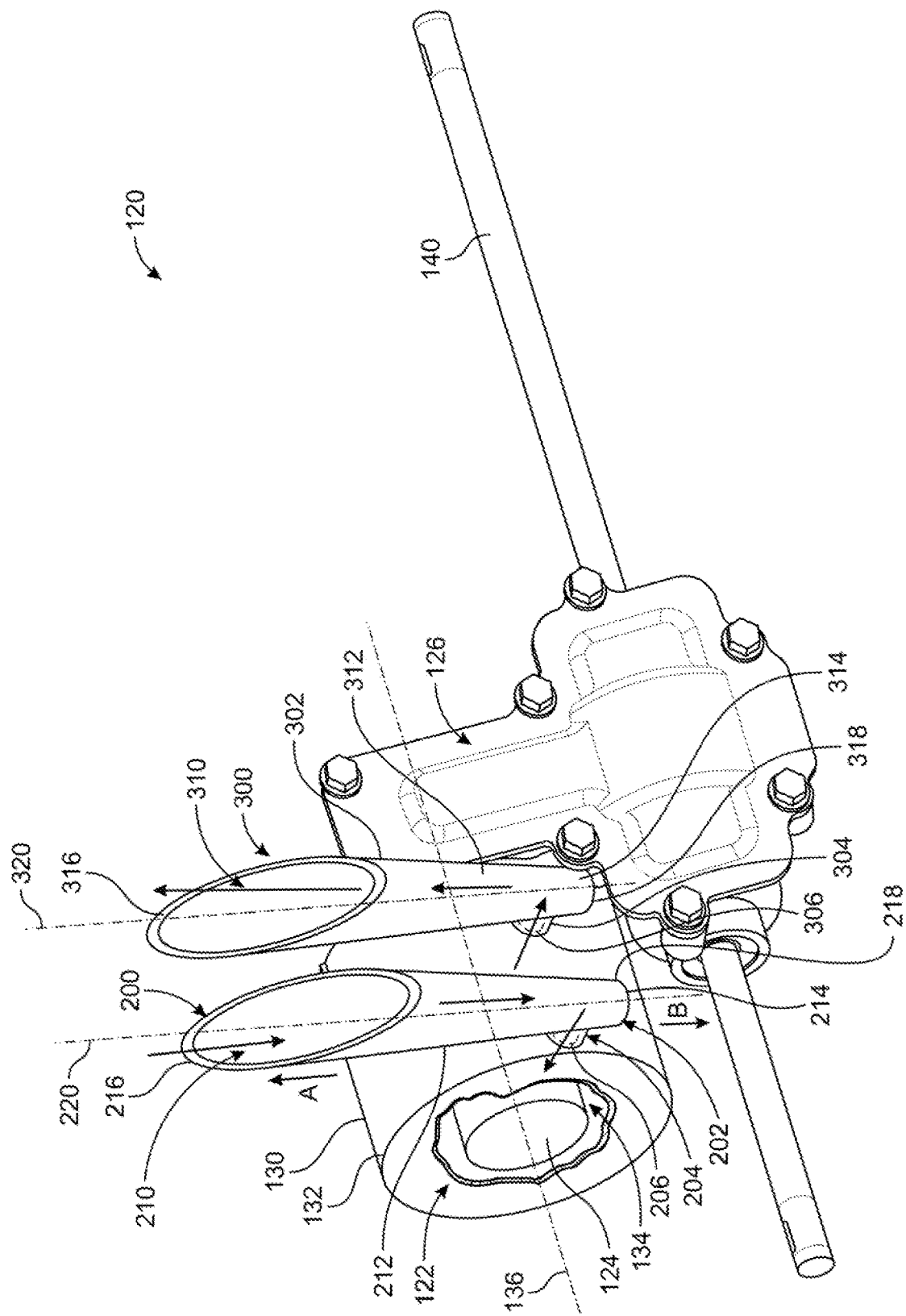
FIG. 3 is a perspective view of the electric transmission of FIG. 2 having an inlet conduit and an outlet conduit, in accordance with one embodiment of the present disclosure.

Referring to FIG. 2 and FIG. 3, the electric transmission 120 includes an electric motor assembly 122 having an electric motor 124 operatively coupled to a transmission assembly 126, which in turn is coupled to the rear wheels 108 to transfer power from the electric motor 124 to the rear wheels 108 to propel the lawnmower 100. In an embodiment, the transmission assembly 126 may include a plurality of gears (not shown) arranged in an epicyclic configuration to manipulate/control an amount of toque or speed transferred to the rear wheels 108. Although, the transmission assembly 126 having an epicyclic configuration of gears is contemplated, it may be appreciated that the gears of the transmission assembly 126 may be arranged in any other configuration, such as, but not limited to, simple gear train. In some embodiment, transmission assembly 126 may include a belt arrangement for transferring power from the electric motor 124 to the rear wheels 108.

The electric motor assembly 120 includes a housing 130 for encasing the electric motor 124 and including a body 132, for example, a cylindrical body 132, that defines a chamber 134 in which the electric motor 124 is arranged. As shown in FIG. 2, the housing 130 may be arranged in a substantially horizontal configuration such that a central axis 136 of the housing 130 may extend substantially parallel to a horizontal surface, such as, ground surface. As shown, the central axis 136 may extend substantially parallel to a rear axle 140 of the lawnmower 100 extending between the rear wheels 108. Further, the housing 130 includes an inlet conduit 200 extending outwardly from the body 132 such that at least a portion of the inlet conduit 200 extends tangentially to an outer surface 142 the cylindrical body 132 to facilitate a flow of air inside the chamber 134. As shown in FIG. 3, the inlet conduit 200 includes a first inlet structure 202 and a second inlet structure 204 connected to the body 132 and extending radially outwardly from the body 132. In an embodiment, the second inlet structure 204 is disposed substantially perpendicular to the outer surface 142 of the body 132. As shown, the second inlet structure 204 includes a conduit shape and defines an outlet port 206 of the inlet conduit 200 to allow an entry of the air inside the chamber 134. For so doing, the outlet port 206 extends through a thickness of the body 132 of the housing 130. Further, the outlet port 206 may be arranged/formed in a lower semicircular portion of the cylindrical body 132. Therefore, the inlet conduit 200 extends from the lower semicircular portion of the cylindrical body 132 in an upward direction.

Moreover, at least a portion of the first inlet structure 202 extends upwardly from the second inlet structure 204 and defines an inlet port 210 of the inlet conduit 200. As such, the first inlet structure 202 includes a first portion 212 extending in a first direction 'A' from the second inlet structure 204, and a second portion 214 extending in a second direction 'B', opposite to the first direction 'A', from the second inlet structure 204. Accordingly, the first portion 212 may extend upwardly from the second inlet structure 204 to a first end 216 of the first inlet structure 202, while the second portion 214 may extend downwardly from the second inlet structure 204 to a second end 218 of the first inlet structure 202. The first end 216 is an open end, defining the inlet port 210, to allow the entry of the air inside the inlet conduit 200, while the second end 218 is closed end to prevent an exit of the air from the second end 218 of the first inlet structure 202.

As shown, the first inlet structure 202 may extend perpendicularly to the second inlet structure 204 and may be disposed substantially parallel to a tangent to the cylindrical body 132. As such, the first inlet structure 202 may extend vertically in a direction perpendicular to the central axis 136 of the body 132. Further, the first inlet structure 202 includes a conduit having a central axis 220 and the inlet port 210 includes an elliptical shape having a central axis 222 (shown in FIG. 2) that is disposed at an inclination relative to the central axis 220 of the first inlet structure 202. As shown, the central axis 222 of the inlet port 210 may extend rearwardly (i.e. towards a rear end of the lawnmower 100) and upwardly. In some embodiments, the second inlet structure 204 may be omitted, in such a case, the first inlet structure 202 is connected to the body 132 and defines the outlet port 206 of the inlet conduit 200.

The air enters the inlet conduit 200 through the inlet port 210, and flows inside the first portion 212 of the first inlet structure 202 along a vertical direction. Thereafter, the air turn in a substantially perpendicular direction and enters the second inlet structure 204. As the air changes the direction to enter the second inlet structure 204 from the first portion 212, the water presents in the air may get separated from the air, and may get accumulated inside the second portion 214. In this manner, the inlet conduit 200 prevents/restricts an entry of water inside the chamber 134. Also, any water entering the inlet conduit 200, during rain or washing of the lawnmower 100, may get accumulated inside the second portion 218, thereby restricting an amount of water entering inside the chamber 134 through the inlet conduit 200. Also, Also, the inclination of the central axis 222 of the inlet port 210 restricts an entry of water inside the inlet conduit 200, during rain or washing of the lawnmower 100, through the inlet port 210. Upon entering the second inlet structure 204 from the first portion 212, the air flows inside the second inlet structure in a substantially horizontal direction and enters the chamber 134 through the outlet port 206. In an embodiment, the outlet port 206 may be located in a lower semicircular portion of the cylindrical body 132. As the outer port 206 is located at the lower portion of the chamber 134, any amount of water that enters the chamber 134 gets accumulated inside the chamber 134 without contacting the electric motor 124. In this manner, the inlet conduit 200 facilitates the entry of air inside the chamber 134 for cooling the electric motor 124, while restricting the entry of water inside the chamber 134 through the inlet conduit 200.

Further, the housing 130 includes an outlet conduit 300 extending outwardly from the body 132 such that at least a portion of the outlet conduit 300 extends tangentially to an outer surface 142 the cylindrical body 132 to facilitate an exit of air from the chamber 134. As shown in FIG. 3, the outlet conduit 300 includes a first outlet structure 302 and a second outlet structure 304 connected to the body 132 and extending radially outwardly from the body 132. In an embodiment, the second outlet structure 304 is disposed substantially perpendicular to the outer surface 142 of the body 132. As shown, the second outlet structure 304 includes a conduit shape and defines an inlet opening 306 of the outlet conduit 300 to allow an entry of the air inside the outlet conduit 300 from the chamber 134. For so doing, the inlet opening 306 extends through a thickness of the body 132 of the housing 130. Further, the inlet opening 306 may be arranged/formed in a lower semicircular portion of the cylindering body 132.

Moreover, at least a portion of the first outlet structure 302 extends upwardly from the second outlet structure 304 and defines an outlet opening 310 of the outlet conduit 300. As such, the first outlet structure 302 includes a first portion 312 extending in a first direction 'A' from the second outlet structure 304, and a second portion 314 extending in a second direction 'B', opposite to the first direction 'A', from the second outlet structure 304. Accordingly, the first portion 312 may extend upwardly from the second outlet structure 304 to a first end 316 of the first outlet structure 302, while the second portion 318 may extend downwardly from the second outlet structure 304 to a second end 218 of the first outlet structure 302. The first end 316 is an open end, defining the outlet opening 310, to allow the exit of the air from the outlet conduit 300, while the second end 318 is closed end to prevent an exit of the air from the second end 318 of the first outlet structure 302.

As shown, the first outlet structure 302 may extend perpendicularly to the second outlet structure 304 and may be disposed substantially parallel to a tangent to the cylindrical body 132. As such, the first outlet structure 302 may extend vertically in a direction perpendicular to the central axis 136 of the body 132. Further, the first outlet structure 302 includes a conduit having a central axis 320 and the outlet opening 310 includes an elliptical shape having a central axis 322 (shown in FIG. 2) that is disposed at an inclination relative to the central axis 320 of the first outlet structure 302. As shown, the central axis 322 of the outlet opening 310 may extend rearwardly (i.e. towards a rear end of the lawnmower 100) and upwardly. In some embodiments, the second outlet structure 304 may be omitted, in such a case, the first outlet structure 302 is connected to the body 132 and defines the inlet opening 306 of the outlet conduit 300. Any water entering the outlet conduit 300, during rain or washing of the lawnmower 100, may get accumulated inside the second portion 318, thereby restricting an amount of water entering inside the chamber 134 through the outlet conduit 300. Also, the inclination of the central axis 322 of the outlet opening 310 restricts an entry of water, during rain or washing of the lawnmower 100, inside the outlet conduit 300 through the outlet opening 310. Further, due to the location of the outer opening 310 in the lower semicircular portion of the chamber 134, any amount of water that enters the chamber 134 gets accumulated inside the chamber 134 without contacting the electric motor 124.

Figure 4:
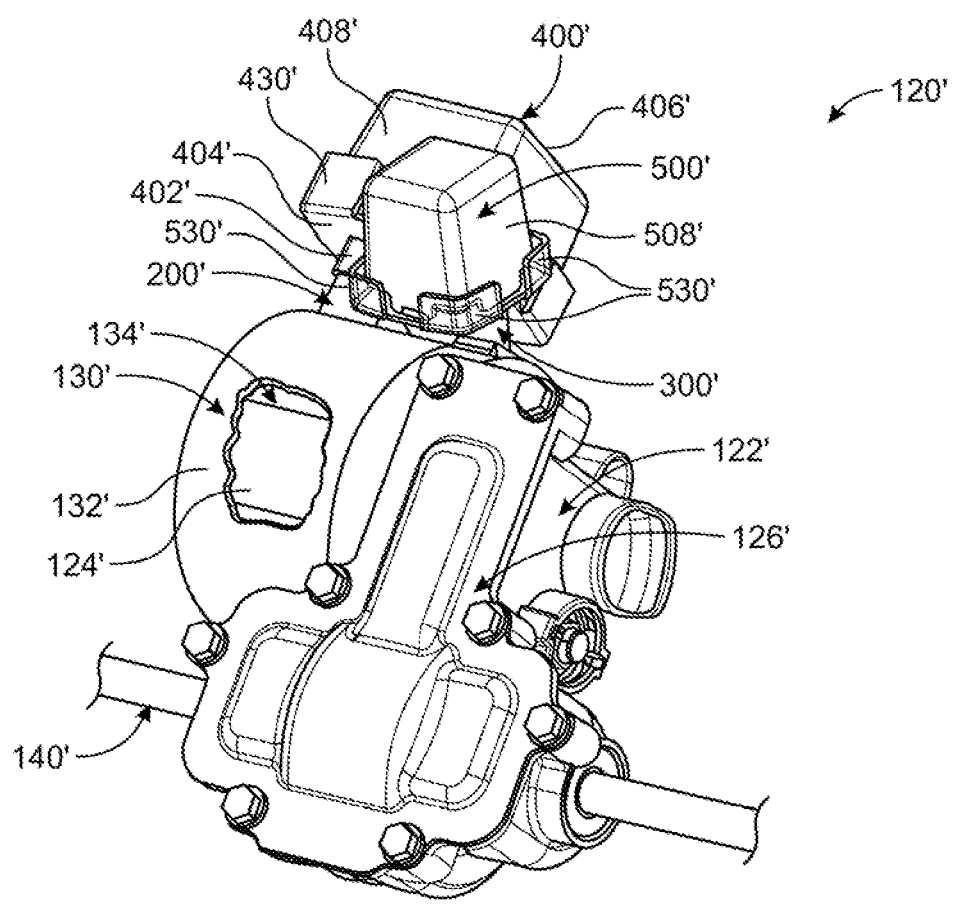
FIG. 4 is a perspective view of an electric transmission having a first cover attached to an inlet conduit, and a second cover engaged with an outlet conduit, in accordance with one embodiment of the present disclosure.
Figure 5:
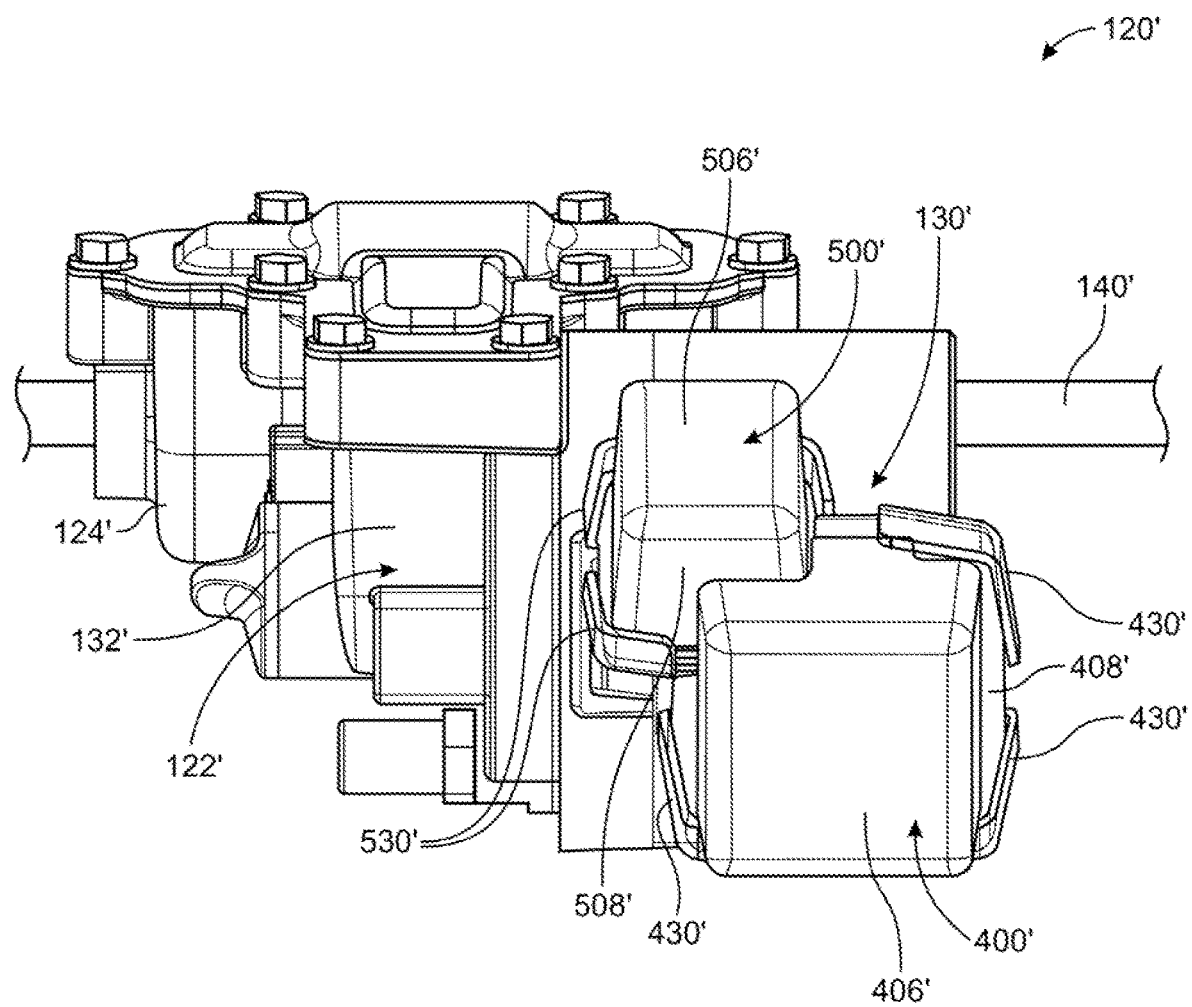
FIG. 5 is a top perspective view of the electric transmission of FIG. 4, depicting the first cover attached to an inlet conduit, and the second cover engaged with an outlet conduit, in accordance with one embodiment of the present disclosure- and FIG. 6 a sectional view of the inlet conduit and the first cover of FIG. 5, depicting an air flow path from ambient to the inlet conduit, in accordance with one embodiment of the present disclosure.

Referring to FIG. 4 and FIG. 5, an electric transmission 120' according to an alternative embodiment is shown. The electric transmission 120' is similar to the electric transmission 120 except that a structure of an inlet conduit 200' and an outlet conduit 300' of the electric transmission 120' is different from the inlet conduit 200 and the outlet conduit 300. Additionally, the electric transmission 120' includes a first cover 400' to cover an inlet port 210' of the inlet conduit 200' and a second cover 500' to cover an outlet opening 310' of the outlet conduit 300'. As shown, the electric transmission 120' includes an electric motor assembly 124' having an electric motor 124' encased in a housing 130', and a transmission assembly 126' connected to the rear wheels 108 via a rear axle 140'. The housing 130' include a body 132', for example, a cylindrical body 132', defining a chamber 134' to receive the electric motor 124'.

Figure 6:
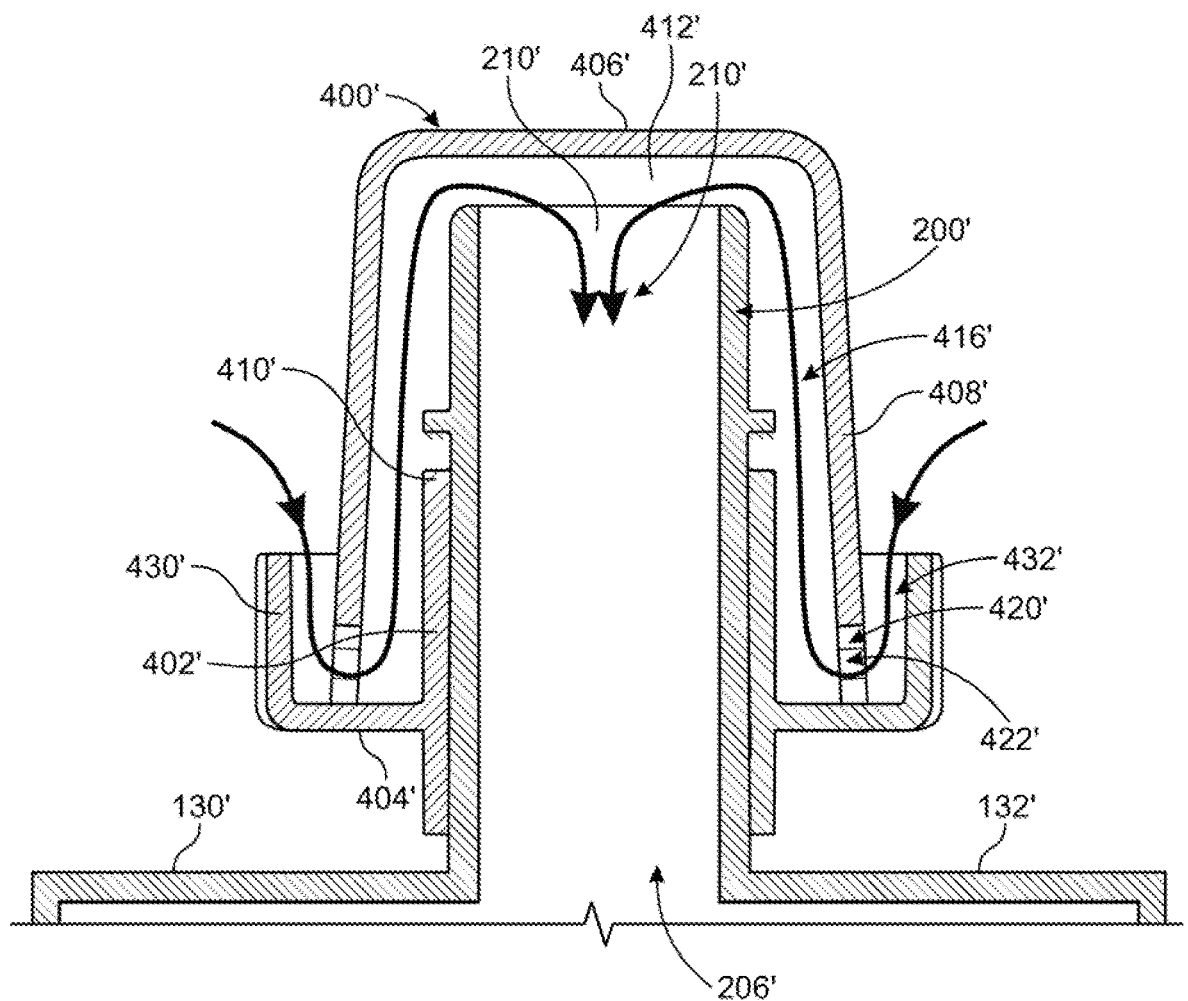

Further, the housing 130' includes the inlet conduit 200' connected to the cylindrical body 132' and extending outwardly from the cylindrical body 132'. As shown, the inlet conduit 200' may extend radially outwardly from a location proximate to an apex of the body 132'. The inlet conduit 200' defines the inlet port 210' that is disposed away from the cylindrical body 132' to facilitate an entry of air inside the inlet conduit 200', and defines an outlet port 206' (shown in FIG. 6) to facilitate an entry of air inside the chamber 134' from the inlet conduit 200'. Additionally, the electric transmission 120' includes the first cover 400' engaged/attached to the inlet conduit 200' and covering the inlet port 210' to restrict an entry of liquid, such as, water, inside the chamber 134'. Referring to FIG. 6, the first cover 400' may include a first tube portion 402', a first flange 404', a first cap 406', and at least one first sidewall 408' extending vertically and downwardly from the first cap 406'. The first tube portion 402' is adapted to receive a portion of the inlet conduit 200' to facilitate an engagement of the first cover 400' with the inlet conduit 200'. As shown in FIG. 6, the first tube portion 402' is disposed circumposing a portion of the inlet conduit 200' and abutting an outer surface of the inlet conduit 200' when engaged with the inlet conduit 200'.

Further, as shown in FIG. 6, the inlet conduit 200' may extend upwardly from the first tube portion 402' such that the inlet port 210' is located at a distance from an upper end 410' of the first tube portion 402'. As shown, the first cover 400' is engaged with the inlet conduit 200' such that the first cap 406' is arranged at a distance from the inlet port 210', thereby defining a first inlet channel 412' therebetween. In an embodiment, the first sidewall 408' may extend vertically downwardly from the first cap 406'. Further, in the assembly of the first cover 400' with the inlet conduit 200', the first sidewall 408' is disposed surrounding a portion of the inlet conduit 200' and is arranged/disposed at a distance from an outer surface of the inlet conduit 200', thereby a first inlet passage 416' is defined between the first sidewall 408' and the inlet conduit 200'. Also, as shown, the first inlet passage 416' and the first inlet channel 412' are disposed substantially perpendicularly to each other. In an embodiment, the first inlet passage 416' may extend vertically, while the first inlet channel 412' may extend substantially horizontally.

Additionally, the first flange 404' extends radially outwardly from the first tube portion 402' and may be connected to the first sidewall 408'. Accordingly, the first flange 404' may be disposed substantially parallel to the first cap 406', and the first sidewall 408' extends from the first cap 406' to the first flange 404'. In an embodiment, the first flange 404' may be integrally formed with the first sidewall 408'. Alternatively, the first flange 404' is attached to the first sidewall 408' by using a plurality of fasteners. Further, the first sidewall 408' may define at least one cut-out 420' disposed proximate to the first flange 404' In this manner, the at least one cut-out 420' defines at least one first opening 422' to facilitate an entry of air from the ambient to the first inlet passage 416'. In an embodiment, the cut-out 420' may extend from an end of the first sidewall 408' connected to the first flange 404'. Accordingly, the at least one cut-out 420' extends from the first flange 404' towards the first cap 406' along a length of the first sidewall 408'. In such a case, the first opening 422' is defined between the first flange 404' and the first sidewall 408'. Alternatively, the cut-out 420' may be defined between the ends of the first sidewall 408' such that the cut-out 420' may be located proximate to the end of the first sidewall 408' connected to the first flange 404'. In some embodiments, the first flange 404' may be located/disposed/arranged spaced apart from the first sidewall 408' defining an opening therebetween to facilitate the entry of air inside the first inlet passage 416'. In such a case, the first tube portion 402' is connected to the first sidewall 408' via one or more elongated ribs.

Further, the first cover 400' may include at least one first lid structure 430' for covering the at least one first opening 422'. The first lid structure 430' is disposed outwardly of the first sidewall 408' and in located spaced apart from the first sidewall 408'. Accordingly, a second inlet passage 432' is defined between the first sidewall 408' and the first lid structure 430'. Further, the first lid structure 430' is connected to the first flange 404', and extends vertically upwardly towards the first cap 406' from the first flange 404'. Also, the first lid structure 430' may extend substantially parallel to the first sidewall 408'. In this manner, the second inlet passage 432' extends in a vertical direction, and is disposed substantially parallel to the first inlet passage 416'. Thereby, the air before entering the inlet conduit 200' flows through the first inlet passage 416', the second inlet passage 432', and the first inlet channel 412'. Accordingly, the first cover 400' provides a zig-zag path for the air to flow from the ambient to the inlet conduit 200', while restricting a flow of water inside the inlet conduit 200', and subsequently to the chamber 134'.

Figure 7:
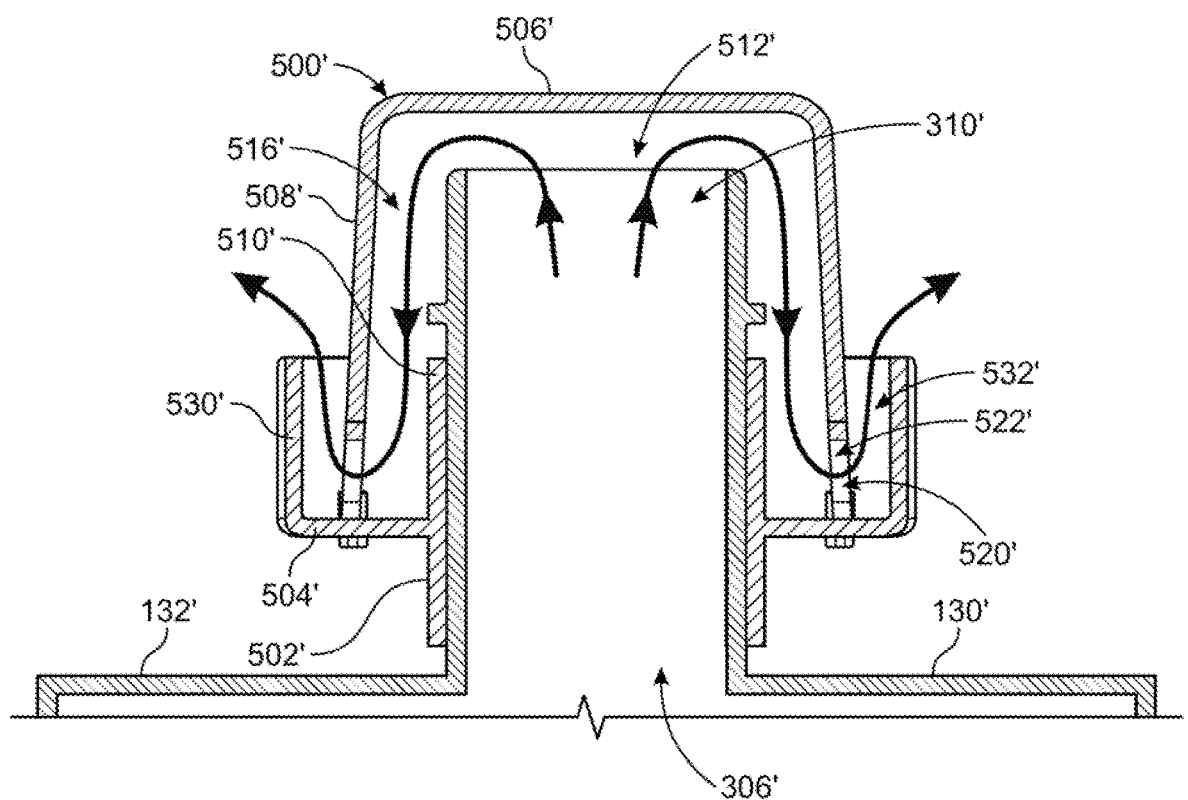
FIG. 7 a sectional view of the outlet conduit and the second cover of FIG. 5, depicting an air flow path from outlet conduit to the ambient, in accordance with one embodiment of the present disclosure.

Again referring to FIG. 4 and FIG. 5, the housing 130' includes the outlet conduit 300' connected to the cylindrical body 132' and extending outwardly from the cylindrical body 132'. As shown in FIGS. 4 and 5, the outlet conduit 300' extends outwardly and upwardly from a location proximate to an apex of the body 132'. The outlet conduit 300' defines the outlet opening 310' that is disposed away from the cylindrical body 132' to facilitate an exit of air from the outlet conduit 300', and defines an inlet opening 306' (shown in FIG. 7) to facilitate an exit of air from the chamber 134'. Additionally, the electric transmission 120' includes the second cover 500' engaged/attached to the outlet conduit 300', and covering the outlet opening 310' to restrict an entry of liquid, such as, water, inside the chamber 134' through the outlet conduit 300'. As shown in FIG. 7, the second cover 500' may include a second tube portion 502', a second flange 504', a second cap 506', and at least one second sidewall 508', extending vertically and downwardly from the second cap 506'. The second tube portion 502' is adapted to receive a portion of the outlet conduit 300' to facilitate an engagement of the second cover 500' with the outlet conduit 200'. As shown, the second tube portion 502' is disposed circumposing a portion of the outlet conduit 300' and abutting an outer surface of the outlet conduit 300', when engaged with the outlet conduit 300'.

Further, as shown in FIG. 7, the outlet conduit 300' may extend upwardly from the second tube portion 502' such that the outlet opening 310' is located at a distance from an upper end 510' of the second tube portion 502'. As shown, the second cover 500' is engaged with the outlet conduit 300' such that the second cap 506' is arranged at a distance from the outlet opening 310', thereby defining a first outlet channel 512' therebetween. In an embodiment, the second sidewall 508' may extend vertically downwardly from the second cap 506'. Further, in the assembly of the second cover 500' with the outlet conduit 300', the second sidewall 508' is disposed surrounding a portion of the outlet conduit 300,' and is arranged/disposed at a distance from an outer surface of the outlet conduit 300'. Accordingly, a first outlet passage 516' is defined between the second sidewall 508' and the outlet conduit 300', and may extend along a length of the second sidewall 508'. As shown, the first outlet passage 516' and the first outlet channel 512' are disposed substantially perpendicularly to each other. In an embodiment, the first outlet passage 416' may extend vertically, while the first outlet channel 512' may extend substantially horizontally.

Additionally, the second flange 504' extends radially outwardly from the second tube portion 502' and may be connected to the second sidewall 508'. Accordingly, the second flange 504' may be disposed substantially parallel to the second cap 506', and the second sidewall 508' extends from the second cap 506' to the second flange 504'. In an embodiment, the second flange 504' may be integrally formed with the second sidewall 508'. Alternatively, the second flange 504' is attached to the second sidewall 508' by using a plurality of fasteners. Further, the second sidewall 508' may define at least one cut-out 520' disposed proximate to the second flange 504' In this manner, the at least one cut-out 520' defines at least one second opening 522' to facilitate an exit of from the first outlet passage 516'. In an embodiment, the cut-out 520' may extend from an end of the second sidewall 508' connected to the second flange 504'. Accordingly, the at least one cut-out 520' extends from the second flange 504' towards the second cap 506' along a length of the second sidewall 508'. In such a case, the second opening 522' is defined between the second flange 504' and the second sidewall 508'. Alternatively, the cut-out 520' may be defined between the ends of the second sidewall 508' such that the cut-out 520' may be located proximate to the end of the second sidewall 508' connected to the second flange 504'. In some embodiments, the second flange 504' may be located/disposed/arranged spaced apart from the second sidewall 508' defining an opening therebetween to facilitate the exit off air from the first outlet passage 516'. In such a case, the second tube portion 502' is connected to the second sidewall 508' via one or more elongated ribs.

Further, second cover 500' may include at least one second lid structure 530' for covering the at least one second opening 522'. The second lid structure 530' is disposed outwardly of the second sidewall 508' and is located spaced apart from the second sidewall 508'. Accordingly, a second outlet passage 532' is defined between the second sidewall 508' and the second lid structure 530'. Further, the second lid structure 530' is connected to the second flange 502', and extends vertically upwardly towards the second cap 506' from the second flange 504'. Also, the second lid structure 530' may extend substantially parallel to the second sidewall 508'. In this manner, the second outlet passage 532' extends in a vertical direction, and is disposed substantially parallel to the first outlet passage 516'. Thereby, the air after exiting the outlet conduit 300' flows through the first outlet channel 512', enters the first outlet passage 516', and subsequently enters the second outlet passage 532' via the second outlet opening 522'. Accordingly, the first cover 400' provides a zig-zag path for the air to flow from the outlet conduit 300' to the ambient, while restricting a flow of water inside the outlet conduit 300' through the outlet opening 310', and subsequently to the chamber 134'.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. An electric transmission adapted to operatively connect to a plurality of wheels for driving an electric lawnmower over a ground surface, the electric transmission comprising:
   an electric motor; and
   a housing encasing the electric motor and including:
      a cylindrical body defining a chamber for receiving the electric motor,
      an inlet conduit connected to the cylindrical body and extending outwardly from the cylindrical body to facilitate a flow of air inside the chamber, the inlet conduit includes:
         a first inlet structure defining an inlet port of the inlet conduit and disposed outwardly of the cylindrical body and extending in a direction substantially parallel to a tangent to the cylindrical body, the first inlet structure includes a first portion and a second portion, and
         a second inlet structure defining an outlet port of the inlet conduit and extending radially outwardly from the cylindrical body to the first inlet structure, wherein the second inlet structure is arranged substantially perpendicular to the first inlet structure, wherein
            the first inlet portion of the first inlet structure extends in a first in a first direction from the second inlet structure, and
            the second inlet portion of the first inlet structure extends in a second direction, opposite to the first direction, from the second inlet structure, and
      an outlet conduit disposed spaced apart from the inlet conduit, the outlet conduit is connected to the cylindrical body and extends outwardly from the cylindrical body to facilitate an exit of air from the chamber to an ambient.

2. The electric transmission of claim 1, wherein the inlet port includes a substantially elliptical shape having a central axis disposed at an inclination relative to a central axis of the first inlet structure.

3. The electric transmission of claim 1, wherein the outlet conduit includes:
   a first outlet structure defining an outlet opening of the outlet conduit and disposed outwardly of the cylindrical body and extending in a direction substantially parallel to a tangent to the cylindrical body, and
   a second outlet structure defining an inlet opening of the outlet conduit and extending radially outwardly from the cylindrical body to the first outlet structure, wherein the second outlet structure is arranged substantially perpendicularly to the first outlet structure.

4. The electric transmission of claim 3, wherein the first outlet structure includes:
   a first portion extending in a first direction from the second outlet structure, and
   a second portion extending in a second direction, opposite to the first direction, from the second outlet structure.

5. The electric transmission of claim 3, wherein the outlet opening includes a substantially elliptical shape having a central axis disposed at an inclination relative to a central axis of the first outlet structure.

6. An electric lawnmower, comprising:
   a plurality of wheels for facilitating a travel of the electric lawnmower over a surface; and
   an electric transmission operatively connected to the plurality of wheels to drive the electric lawnmower over the surface, the electric transmission includes:
      an electric motor, and
      a housing encasing the electric motor and including:
         a cylindrical body defining a chamber for receiving the electric motor,
         an inlet conduit connected to the cylindrical body and extending outwardly from the cylindrical body to facilitate a flow of air inside the chamber, the inlet conduit includes:
            a first inlet structure defining an inlet port of the inlet conduit and disposed outwardly of the cylindrical body and extending in a direction substantially parallel to a tangent to the cylindrical body, the first inlet structure includes a first portion and a second portion, and
            a second inlet structure defining an outlet port of the inlet conduit and extending radially outwardly from the cylindrical body to the first inlet structure, wherein the second inlet structure is arranged substantially perpendicular to the first inlet structure, wherein
               the first inlet portion of the first inlet structure extends in a first in a first direction from the second inlet structure, and
               the second inlet portion of the first inlet structure extends in a second direction, opposite to the first direction, from the second inlet structure, and
         an outlet conduit disposed spaced apart from the inlet conduit, the outlet conduit is connected to the cylindrical body and extends outwardly from the cylindrical body to facilitate an exit of air from the chamber to an ambient.

7. The electric lawnmower of claim 6, wherein the inlet port includes a substantially elliptical shape having a central axis disposed at an inclination relative to a central axis of the first inlet structure.

8. The electric lawnmower of claim 6, wherein the outlet conduit includes:
   a first outlet structure defining an outlet opening of the outlet conduit and disposed outwardly of the cylindrical body and extending in a direction substantially parallel to a tangent to the cylindrical body, and
   a second outlet structure defining an inlet opening of the outlet conduit and extending radially outwardly from the cylindrical body to the first outlet structure, wherein the second outlet structure is arranged substantially perpendicular to the first outlet structure.

9. An electric transmission operatively connected to a plurality of wheels for driving an electric lawnmower over a ground surface, the electric transmission comprising:
   an electric motor; and
   a housing encasing the electric motor and including:
      a cylindrical body defining a chamber for receiving the electric motor,
      an inlet conduit extending outwardly to the cylindrical body to facilitate a flow of air inside the chamber, the inlet conduit includes:
         a first inlet structure defining an inlet port of the inlet conduit and disposed outwardly of the cylindrical body and extending in a direction substantially parallel to a tangent to the cylindrical body, the first inlet structure includes a first portion and a second portion, and a second inlet structure defining an outlet port of the inlet conduit and extending radially outwardly from the cylindrical body to the first inlet structure, wherein the second inlet structure is arranged substantially perpendicularly to the first inlet structure, wherein
   the first inlet portion of the first inlet structure extends in a first in a first direction from the second inlet structure, and
   the second inlet portion of the first inlet structure extends in a second direction, opposite to the first direction, from the second inlet structure, and an outlet conduit extending outwardly to the cylindrical body to facilitate an exit of air from the chamber to an ambient, the outlet conduit includes:

a first outlet structure defining an outlet opening of the outlet conduit and disposed outwardly of the cylindrical body and extending in a direction substantially parallel to a tangent to the cylindrical body, and a second outlet structure defining an inlet opening of the outlet conduit and extending radially outwardly from the cylindrical body to the first outlet structure, wherein the second outlet structure is arranged substantially perpendicularly to the first outlet structure.

\* \* \* \* \*